April 14, 1931.  R. E. PHELAN ET AL  1,801,105
PROCESS OF SULPHIDE ORE TREATMENT
Filed Nov. 3, 1926
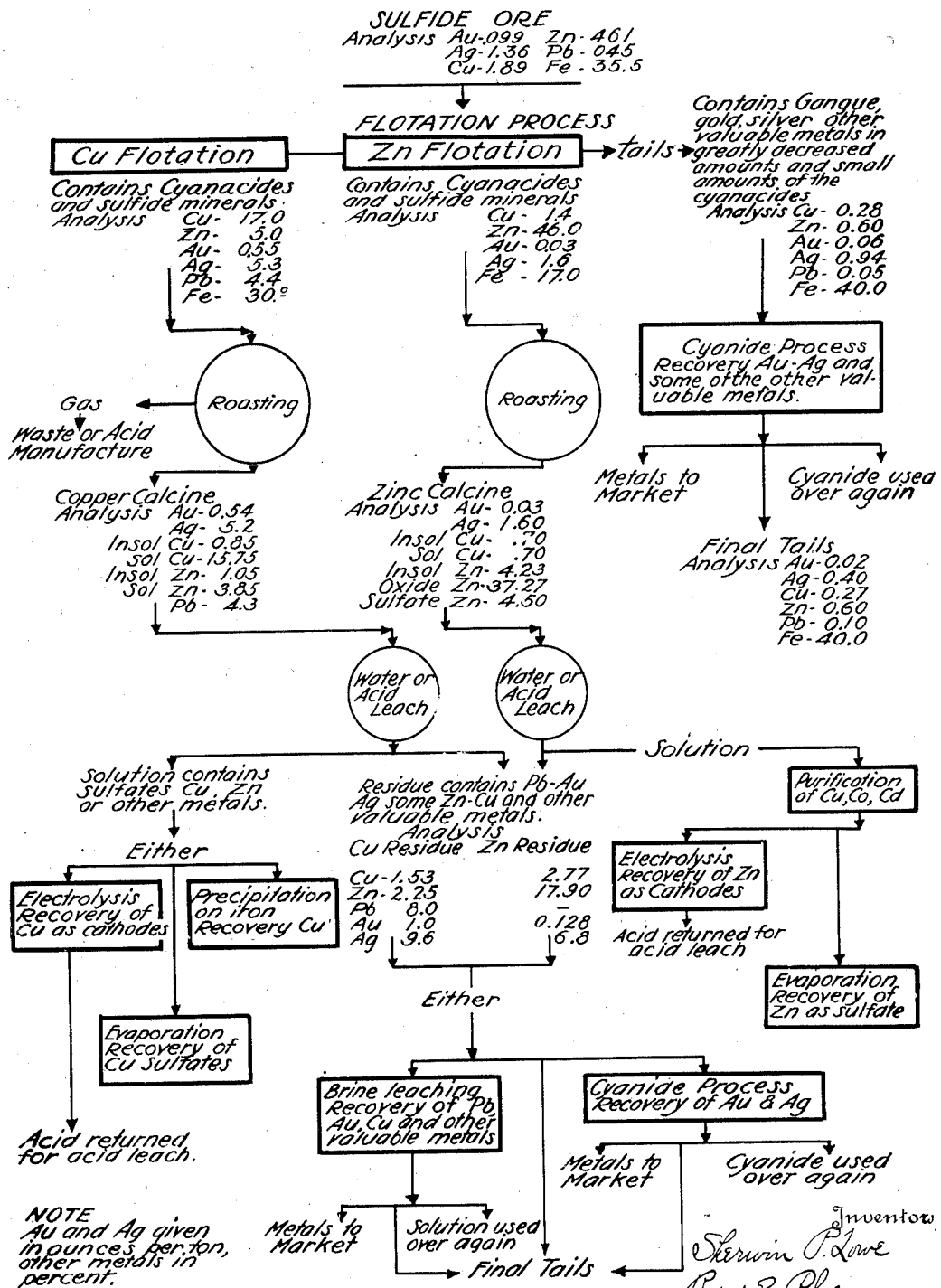

Patented Apr. 14, 1931

1,801,105

UNITED STATES PATENT OFFICE

ROBERT E. PHELAN, SHERWIN P. LOWE, AUDIS B. CLAMPITT, HENRY T. KOENIG, AND OSCAR A. FISCHER, OF DENVER, COLORADO, ASSIGNORS TO R. H. CHANNING, JR., AGENT, OF SAN FRANCISCO, CALIFORNIA

PROCESS OF SULPHIDE ORE TREATMENT

Application filed November 3, 1926. Serial No. 146,061.

The object of this invention is to provide an efficient and complete method of treating metalliferous sulphide containing a plurality of metals, for the recovery of those metals by means of certain combinations of flotation, cyanidation, roasting, leaching and electrolysis. These combinations, together with new and useful improvements in the processes discovered by us present decided improvements over present methods in that many difficulties encountered in present practice are avoided and the treatment of some ores can be successfully carried out, for which no commercial method of treatment is now known. By metalliferous sulphides is meant combinations of metal sulphides, metal sulphides with ore or gangue, or sulphide ore.

In the accompanying drawing the figure is a flow sheet illustrating the steps of the process.

As an example, the combination of processes is as follows, but many other combinations of these processes may be used:

First: Flotation to separate into higher grade concentrates in as pure a form as possible, as many of the valuable metal sulphides as possible, making a separate product of as high purity as possible for each valuable metal.

Second: Cyaniding the flotation tailings for the recovery of as high a percentage of the valuable metals contained as possible.

Third: Recovering, i. e. regenerating for use again, as high a percentage of the cyanide as possible and as much of the metals still contained as possible, for sale, and using the cyanide so recovered over again. Thus not only recovering valuable metals but reducing the cost of the operation to a minimum, since a large part of the cyanide is used over and over again, and so the consumption is reduced.

Fourth: Roasting the concentrates produced, each kind of concentrate in a separate furnace or furnaces by either standard or one of the concurrent methods of roasting, the latter being much preferred by us.

Fifth: Leaching the roasted concentrates separately to produce a sulfate solution containing the valuable metal contained in each concentrate in as pure a form as possible. This step includes the necessary purification of the solutions.

Sixth: Passing the solutions obtained in "Five" separately through electrolytic cells particularly adapted to the deposition of the particular metal in the solution and thus depositing pure metal cathodes, which can be melted, cast and sold without further treatment, or if preferable, any other method of metal recovery may be used.

Seventh: The residue from the leaching operation treated for the recovery of any remaining valuable metals. We have found a successful method for the treatment of the residue to be as follows: The residue is treated with a salt solution containing sulfuric or other acids, and chlorine gas, preferably to saturation. This solution, after a short period of use has the following composition:

NaCl _____ 22%
$H_2SO_4$ _____ 1.5%
$FeCl_3$ _____ 1.5%
Cl _____ To saturation plus many other sulfates and chlorides.

Eighth: The precipitation of the valuable metals by any proven method, but preferably by the electric current.

Frequently, in present metallurgical practice involving cyanidation, various cyanicides are present in the ore being treated. These bring about a high cyanide consumption. It is desirable to remove such cyanicides before proceeding with cyanidation as the cyanide used is thus reduced and the cost of the operation cheapened.

Furthermore, in metallurgical practice involving roasting followed by leaching, much insoluble ferrite of the valuable metals may be formed during the roast, thereby lowering the recovery of the metal content of the ore. Iron aids the formation of ferrites and it is, therefore, desirable to remove at least some of the iron before the ore goes to the roasting furnaces, and thus during the roast prevent the formation of as much ferrite as possible by reducing the amount of iron present.

Present methods usually develop two difficulties in the treatment of complex sulphides. First, in the recovery of gold and silver contained in the ore, by the cyanide process, many cyanicides are often present which bring about a cyanide consumption that makes the process economically prohibitive, or at least excessively costly. Second, processes of roasting followed by leaching sometimes produce products which are insoluble in water or acid. Concurrent roasting gives higher recoveries of the metals, better physical and chemical character to the calcine and cheaper cost of operation. Concurrent roasting is disclosed in our Patent No. 1,582,347.

By our invention we accomplish the recovery of metals by the combination of some or all of the following processes, viz, flotation, cyanidation, concurrent roasting, water and acid leaching, and chlorine brine leaching. The process is applied to any kind of sulphide ores or minerals, and the general steps of the process, are indicated in the accompanying flow sheet.

The sulphides treated may be simple sulphides or mixtures known as complex ores. The invention is especially applicable to sulphides of copper or zinc, or iron, or mixtures of these and other sulphides and precious metals. For example, the process may be applied to a complex ore of the following composition:

| | |
|---|---|
| Fe | 35.0% |
| Au | 0.1 ozs. |
| Ag | 2.0 ozs. |
| Cu | 2.0% |
| Zn | 5.0% |
| Pb | 2.0% |
| S | 40.0% |

Our result is accomplished by subjecting the ore to flotation for the removal of the copper minerals and zinc minerals, preliminary to cyanide treatment. If this is not done the consumption of cyanide in the recovery of the gold and silver would be prohibitive. After the removal of the copper and zinc the recovery of gold and silver from the flotation tailings is readily attained at a commercial cost and low net cyanide consumption. The zinc minerals, with some iron (but this is kept at a minimum), is recovered in the same mill, either in the same or a separate concentrate from the copper minerals. Most of the iron goes off with the flotation tailings and is thus prevented from going to the roasters where it would increase the tendency to form insoluble ferrites of the valuable metals. The concentrates are roasted separately in concurrent roasters. The maximum amount of acid-soluble oxides are formed to give the highest recovery of metals. During the zinc roasting, oxides of zinc and some zinc sulfate is formed. By the concurrent method of roasting a minimum quantity of insoluble ferrites is formed and the removal of the copper and zinc by leaching in aqueous solution, is readily and cheaply attained. In the case of copper, by a slight change in the roasting conditions from those used to roast zinc concentrates, the maximum amount of soluble copper sulfate is formed and a very high extraction of the copper attained.

What we claim is:—

1. A process for the treatment of sulphide ores, comprising subjecting the ores to a predetermined and selective flotation in a liquid free from cyanid to concentrate the copper to remove cyanicides, then cyaniding the tailings and to recover precious metals and finally regenerating the cyanide.

2. A process for the treatment of sulphide ores containing copper, iron, and precious metals, comprising subjecting the ore to a predetermined and selective flotation separation in a liquid free from cyanid, whereby the copper and only a portion of the iron will be found in the concentrate, then cyaniding the flotation tailings to recover the precious metals.

3. A process for the treatment of sulphide ores containing copper, zinc, iron and precious metals, comprising subjecting the ores to preferential predetermined and selective flotation separation in a liquid free from cyanid, whereby the copper and only a portion of the iron will be found in the copper concentrates, and the zinc and a very small portion of the iron in the zinc concentrates, and then cyaniding the flotation tailings to remove the precious metals.

4. A process for the treatment of sulphide ores containing copper, zinc, iron and precious metals, comprising subjecting the ores to a predetermined and selective flotation separation in a liquid free from cyanid, whereby the copper and only a portion of the iron will be found in the copper concentrates, and the zinc and a very small portion of the iron in the zinc concentrates and then cyaniding the flotation tailings, developing in the concentrates a controlled quantity of ferrites by a separate roasting, leaching the roasted concentrates separately and precipitating the copper and zinc from the leach solutions by any suitable means.

5. A process for the treatment of sulphide ores containing copper, zinc, iron and precious metals, comprising the cooperating steps subjecting the ores to a predetermined and selective flotation separation in a liquid free from cyanid, whereby the copper and only a portion of the iron will be found in the copper concentrates, and the zinc and a very small portion of the iron in the zinc concentrates, developing in the concentrates a controlled quantity of ferrites by a separate roasting, leaching the roasted concentrates separately and precipitating the copper and zinc from the leach solutions by any suitable means, and leaching of the residue after leaching out the copper or zinc from their respective concentrates, to recover the precious metals and any lead contained.

6. A non-smelting process for the treatment of complex ores comprising roasting a copper cencentrate of the same having a lower percentage of iron than in the original ore, leaching the calcined mass, and treating the residue to extract the precious metals therefrom.

In testimony whereof, we affix our signatures.

SHERWIN P. LOWE.
OSCAR A. FISCHER.
AUDIS B. CLAMPITT.
HENRY T. KOENIG.
R. E. PHELAN.